(12) United States Patent
Lehtikangas et al.

(10) Patent No.: US 7,711,378 B2
(45) Date of Patent: May 4, 2010

(54) METHOD AND A SYSTEM FOR TRANSMITTING A SHORT MESSAGE

(75) Inventors: Juha Lehtikangas, Oulu (FI); Hanna Orhala, Helsinki (FI)

(73) Assignee: TeliaSonera Finland Oyj, Helsinki (FI)

( * ) Notice: Subject to any disclaimer, the term of this patent is extended or adjusted under 35 U.S.C. 154(b) by 452 days.

(21) Appl. No.: 10/872,644

(22) Filed: Jun. 21, 2004

(65) Prior Publication Data

US 2004/0266464 A1   Dec. 30, 2004

(30) Foreign Application Priority Data

Jun. 24, 2003   (FI)   ................... 20030937

(51) Int. Cl.
*H04W 4/00* (2009.01)
(52) U.S. Cl. .................. 455/466; 455/403; 455/445
(58) Field of Classification Search ................ 455/466, 455/435.1, 433, 412.1, 432.3, 455, 412.2, 455/445, 414.1, 552.1
See application file for complete search history.

(56) References Cited

U.S. PATENT DOCUMENTS

| | | | |
|---|---|---|---|
| 5,579,372 A | | 11/1996 | Åström |
| 5,758,286 A | * | 5/1998 | Leppanen .................. 455/445 |
| 5,915,222 A | * | 6/1999 | Olsson et al. ............... 455/466 |
| 6,587,693 B1 | * | 7/2003 | Lumme et al. .............. 455/466 |
| 6,792,276 B1 | * | 9/2004 | Butovitsch et al. .......... 455/453 |
| 7,203,507 B2 | * | 4/2007 | Smith et al. ................. 455/466 |
| 2003/0154257 A1 | * | 8/2003 | Hantsch et al. ............. 709/207 |
| 2004/0259531 A1 | * | 12/2004 | Wood et al. ............... 455/412.1 |
| 2005/0119017 A1 | * | 6/2005 | Lovell et al. ................ 455/466 |

FOREIGN PATENT DOCUMENTS

| | | |
|---|---|---|
| EP | 1 294 204 A1 | 3/2003 |
| WO | WO 95/06381 | 3/1995 |
| WO | WO 97/23081 | 6/1997 |
| WO | WO 01/08428 A1 | 2/2001 |

OTHER PUBLICATIONS

"Virtual Network Milborn White Paper" Telesoft Technologies, Mar. 18, 2002.

* cited by examiner

*Primary Examiner*—Dwayne Bost
*Assistant Examiner*—Myron Wyche
(74) *Attorney, Agent, or Firm*—Cohen, Pontani, Lieberman & Pavane

(57) ABSTRACT

A method for transmitting a short message between two terminals includes determining the receiver of the short message based on a so-called short number, which short number is common to a plurality of A-subscribers, wherein the B-subscriber indicated by the short number is different for each of the plural A-subscribers. The short message is transmitted via a short message service center to a virtual home location register, which gives the short number routing information for a virtual mobile switching center. The short number is converted into a connection number corresponding to the short number and associated with the A-subscriber, the connection number being suitable for the communication network of the B-subscriber. The message is then routed to the B-subscriber based on the connection number.

17 Claims, 2 Drawing Sheets

METHOD AND A SYSTEM FOR TRANSMITTING A SHORT MESSAGE

CROSS-REFERENCE TO RELATED APPLICATIONS

This application claims priority under 35 USC §119 to Finnish Patent Application No. 20030937 filed on Jun. 24, 2003.

FIELD OF THE INVENTION

The present invention relates to a method for transmitting a short message from an A-subscriber to a B-subscriber by using the communication connection formed between the A-subscriber and a short message service center, the short message is transmitted to the short message service center, from where the short message is further transmitted to a mobile switching center to be routed to a connection number suitable for the communication network of the B-subscriber. In addition, the invention relates to a system implementing the method. The invention further relates to a mobile switching center for transmitting a short message from an A-subscriber to a B-subscriber, which mobile switching center comprises means for transmitting a short message to a connection number suitable for the communication network of the B-subscriber,

BACKGROUND OF THE INVENTION

SMS (Short Message Service) is a wireless service used by means of digital terminals operating in a wireless communication network, by means of which it is possible to transfer text-based (maximum of 160 characters at a time) short messages from one terminal, such as a mobile phone, to another. The service uses a Short Message Service Center (SMSC) for storing and transmitting short messages.

The short message is received after transmission in the short message service center, whose task is to deliver it to the correct target terminal (the B-subscriber). The short message service center sends an SMS Request to a Home Location Register (HLR) in order to locate the receiver. When receiving the request, the home location register responds to the short message service center by reporting, among other things, the accessibility status of the receiver. If the receiver is not accessible, the short message service center stores the message for a certain time. When the receiver activates his/her device, the home location register sends information on this to the short message service center, which sends a message to the service system to be transmitted further to the device. After this, the short message service center receives a confirmation on the arrival of the message at the receiver.

The short message service center functions as storage and a transmitter for short messages. Short messages are divided into mobile originating (MO) and mobile terminating (MT) messages. The MO messages (originating) are transmitted to the short message service center, i.e. they are going to another terminal. The MT messages (terminating) are transmitted to a receiving terminal operating in the communication network being used, i.e. they have left from another terminal or applications.

According to prior art, as the receiver of the short message is to be determined that address (phone number) according to which the receiving terminal is identified in the communication network. This is the procedure even if the receiver and the sender have a mutual contract on the use of certain short numbers, the so-called home call numbers. These short numbers are predetermined numbers used in connection with phone calls, by means of which it is possible to form a connection to the receiver. This kind of use of short numbers in connection with phone calls is described, for example, in the patent publication FI 98185 of the applicant. In the method according to the publication, an outgoing phone call is connected to a switching exchange, where the number is converted into a number suitable for the communication network on the basis of a short number table. After this, the phone call is directed to the bearer of the short number. The idea of the short numbers is to provide each party desiring a connection, i.e. a caller, with the so-called A-subscriber a short number to be used with the receivers of the phone call, the so-called B-subscribers. This short number is common to substantially all the A-subscribers of the same network provider, but the short number is, however, dependent on the A-subscriber in question. Each A-subscriber must determine the actual numbers of the B-subscribers, which correspond to the short numbers of the A-subscriber in question. A short number comprises a first part common to all A-subscribers, and an identification number (e.g. 020 10y). The identification number in the short number is pre-stored in the A-subscriber-specific database, which is in the use of the mobile switching center, and from which the actual number of the B-subscriber can be determined. According to prior art, it has been possible to use these short numbers only in connection with transmitting phone calls, not in connection with outgoing short messages.

SUMMARY OF THE INVENTION

The purpose of the present invention is to enable sending short messages by using short numbers instead of the actual receiver numbers. In order to implement this, the method according to the present invention is primarily characterized in that in the method, a short message is transmitted to a target number, which depends on the A-subscriber and is a short number common to A-subscribers, in which case a short message is transmitted to the short message service center (SMSC) and further to a virtual mobile switching center (vMSC), in which case said short number is converted to a connection number corresponding to it and suitable for the communication network of the B-subscriber, on the basis of which the transmission of the short message is performed. The system according to the invention is primarily characterized in that the received short message comprises as a target number some short number that depends on the A-subscriber and is common to A-subscribers, in which case the system comprises, in addition, means for converting said short number to a connection number corresponding to it and suitable for the communication network of the B-subscriber in order to transmit the short message. The mobile switching center according to the invention is primarily characterized in that the mobile switching center is a virtual mobile switching center, in which case when the received short message comprises as a target number a short number that depends on the A-subscriber and is common to A-subscribers, the virtual mobile switching center is arranged to convert said short number to a connection number corresponding to it and suitable for the communication network of the B-subscriber.

With the invention, in addition to phone calls, it is possible to use short numbers for transmitting short messages as well. If the receiver is not accessible, the short message can be left in the short message service center to wait for the B-subscriber to login to the network. The solution according to the invention is not limited only to the home network of the A-subscriber, but it can also be utilized in connection with network roaming. The visitor network does not, however, necessarily have to be updated according to the invention, but the method according to the invention operates irrespective of the functionalities of the visitor network.

DESCRIPTION OF THE DRAWINGS

In the following, the invention will be described in more detail with reference to the appended drawings, in which.

DETAILED DESCRIPTION OF THE INVENTION

Figure 1:
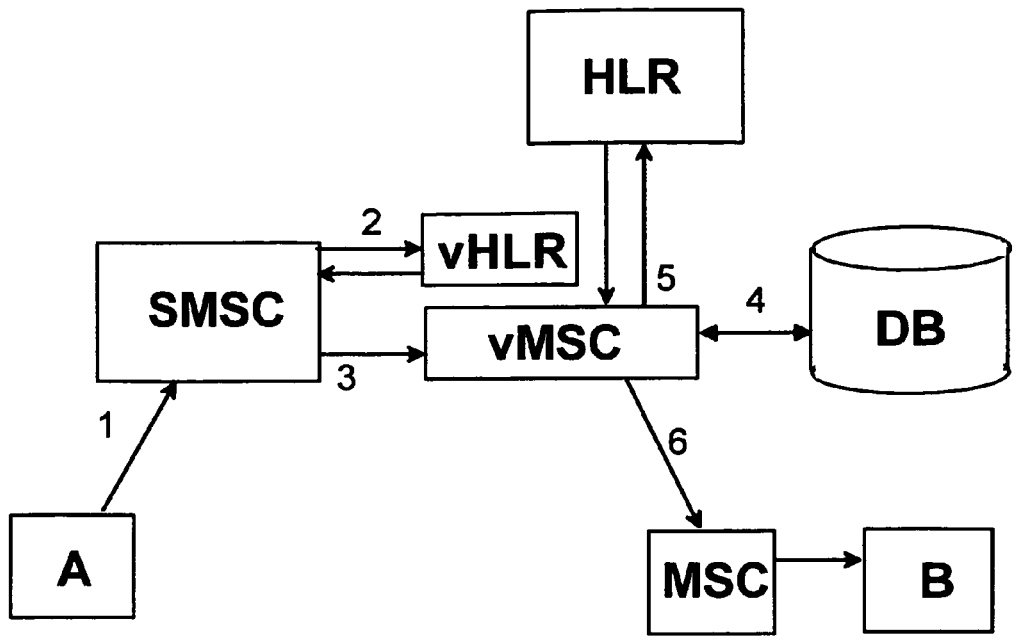
FIG. 1 presents an advantageous example of the architecture of the method according to the invention, wherein the transmission of a short message has been successful.

FIG. 1 presents an advantageous embodiment of the method according to the invention, wherein a short message is transmitted from the A-subscriber to the short number of the B-subscriber. In the method, a communication connection is formed by taking the short number corresponding to the B-subscriber at the terminal of the A-subscriber. The identification number of the short number is pre-stored in the A-subscriber-specific database DB, which the mobile switching center MSC or a corresponding network node can use. In the method, a short message is sent from the terminal of the A-subscriber to the terminal of the B-subscriber. The terminals are advantageously mobile phones or other corresponding wireless or wired terminals suitable for voice and text messaging. The terminal of the A-subscriber comprises a connection number suitable for the communication network and used for communication, e.g. 040-xxxxxxx, which communication network is advantageously a wireless mobile communication network, such as GSM, GPRS, UMTS or the like. The numbers of the connection number identify the subscriber and determine the communication network provider used. Correspondingly, the B-subscriber has a connection number enabling communication, which can be in the form of 040-yyyyyyy. In addition to these numbers, which are thus subscriber-specific and therefore different from each other, the A- and B-subscribers have made a home call contract as described above. Along with the home call contract, short numbers are determined for the A- and B-subscribers, by means of which the invoicing of phone calls, short messages, and other contacts can be grouped. The short numbers are the same for all A-subscribers, but the numbers corresponding to them and suitable for the communication network of the B-subscribers vary according to the specification of the A-subscribers.

The A-subscriber forms a short message SM at his/her terminal, the target communication number of which is the short number 020 10y of the B-subscriber. In order to identify the A-subscriber, the number 040-xxxxxxx suitable for the communication network of the A-subscriber is attached to the short message SM. The originating short message MO SM is transmitted (1) to the short message service center SMSC in a manner known as such, in which case the short message service center SMSC requests for routing information (2) (SRI, Send Routing Info) for the short message SM to the number 020 00y, According to the invention, the routing information request SRI is transmitted to the home location register, which is a virtual home location register vHLR and which provides a temporary identification number for transmitting an short message, a temporary IMSI number (International Mobile Subscriber Identity). The IMSI number is typically used in identifying a subscriber in a home location register HLR of a communication network, and by means of it the other registers and networks know about the availability of the terminal in question. The temporary IMSI number according to the invention is re-usable, in which case it can, after a certain time, be taken into use in connection with some other terminal. In addition to the temporary IMSI number, the address of the mobile switching center is transmitted to the short message service center in the routing information response, which mobile switching center is according to the invention a virtual Mobile Switching Center vMSC. In this connection, the short number of the B-subscriber is stored in the database DB together with the temporary IMSI number, in which case this temporary IMSI number can be used as a key later when searching the short number from the database DB.

The short message service center SMSC transmits (3) the terminating short message MT SM to the virtual mobile switching center vMSC, which sends an receipt acknowledgement back to the short message service center SMSC. In a virtual mobile switching center vMSC, the selection of the A-subscriber is analyzed, in which case the A-subscriber and the right of the A-subscriber to the short number service are identified. The short number of the B-subscriber is searched (4) from the database DB by means of said temporary IMSI number. After this, the virtual mobile switching center vMSC performs another query to the database DB in order to convert the short number of the B-subscriber to a normal number sequence (040-yyyyyyy) suitable for the communication network by means of the A-subscriber-specific short number table. At the same time, the short number determined for the A-subscriber (020 10x) can be determined.

The virtual mobile switching center vMSC sends (5) a routing information request (SRI) to the actual home location register HLR for the number 040-yyyyyyy suitable for the communication network of the B-subscriber. For this routing information request, the virtual mobile switching center vMSC receives the actual IMSI number of the B-subscriber and the address of the actual mobile switching center MSC. Through this, the virtual mobile switching center vMSC transmits (6) the terminating short message MT SM to the actual mobile switching center MSC, which forms a connection to the terminal of the B-subscriber with the normal number of the B-subscriber.

Figure 2:
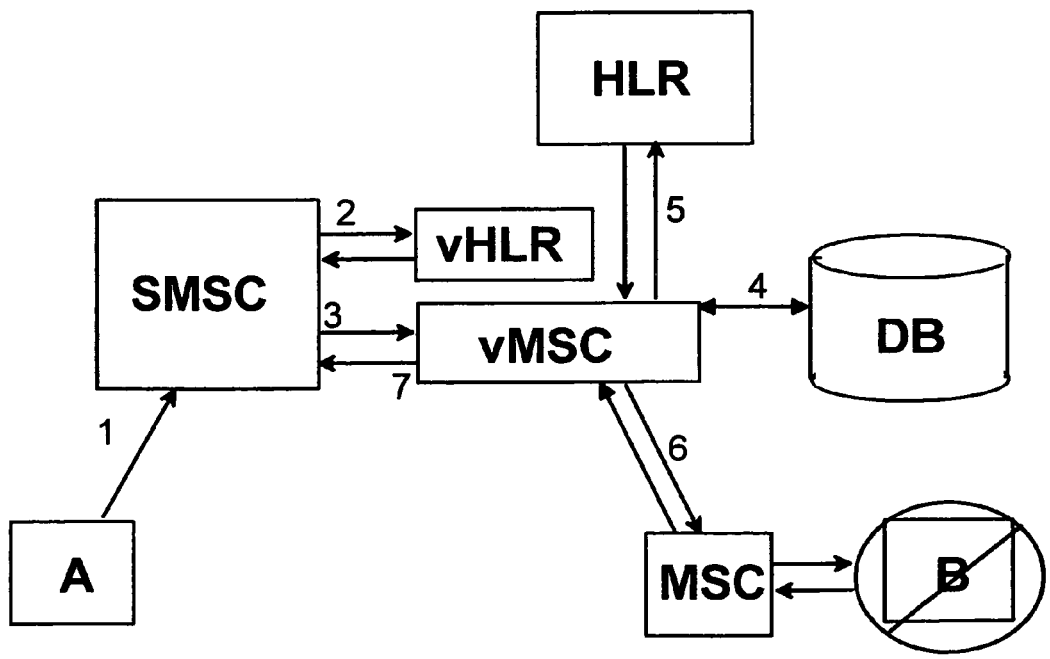
FIG. 2 presents an example of the architecture of the method according to the invention, wherein the receiver is not accessible.

FIG. 2 presents an advantageous embodiment of the method according to the invention in such a situation, where the short message is aimed to be transmitted to such a short number, whose terminal is not accessible, e.g. out of use or outside the coverage area of the network.

Even in this situation, the transmission of a short message operates as in the previous case. The originating short message MO SM is aimed to be directed to the short number 020 10y of the B-subscriber. The short message is transmitted (1) to the short message service center SMSC, which requests (2) for routing information for said short number from the virtual home location register vHLR. This transmits the requested information back together with a temporary IMSI number, as well as the address of the virtual mobile switching center vMSC. The IMSI number is stored in the database DB together with the short number of the B-subscriber. By means of the information it has received, the short message service center MSMC directs (3) the terminating short message MT SM to the virtual mobile switching center vMSC, which performs (4) a query to the database DB on the actual number of the B-subscriber, and, if necessary, of the short number of the A-subscriber.

The virtual mobile switching center vMSC requests (5) routing information for the actual connection number 040-yyyyyyy of the B-subscriber from the actual home location register HLR. After receiving the IMSI number of the B-subscriber, the virtual mobile switching center vMSC transmits the terminating short message MT SM (6) to the actual mobile switching center MSC, which aims to form a connection with the normal number of the B-subscriber. In this connection it is noticed that the terminal corresponding to the number of the B-subscriber has been switched off or is outside of the coverage area, in which case the short message cannot be transmitted. The short message is returned back to the virtual mobile switching center vMSC, which converts the terminating short message MT SM to a return message, i.e. an originating short message MO SM. This originating short message MO SM comprises as its receiving number the actual connection number 040-xxxxxxx of the A-subscriber or the short number 020 10x of the A-subscriber, as well as the actual number 040-yyyyyyy of the B-subscriber. The originating short message MO SM is transmitted to the short message service center SMSC, where it remains waiting for the connection of the B-subscriber to open. When the B-subscriber the next time connects to the communication network, for example when the phone is turned on, or when leaving a shadow area, the message is transmitted in a known manner.

Figure 3:
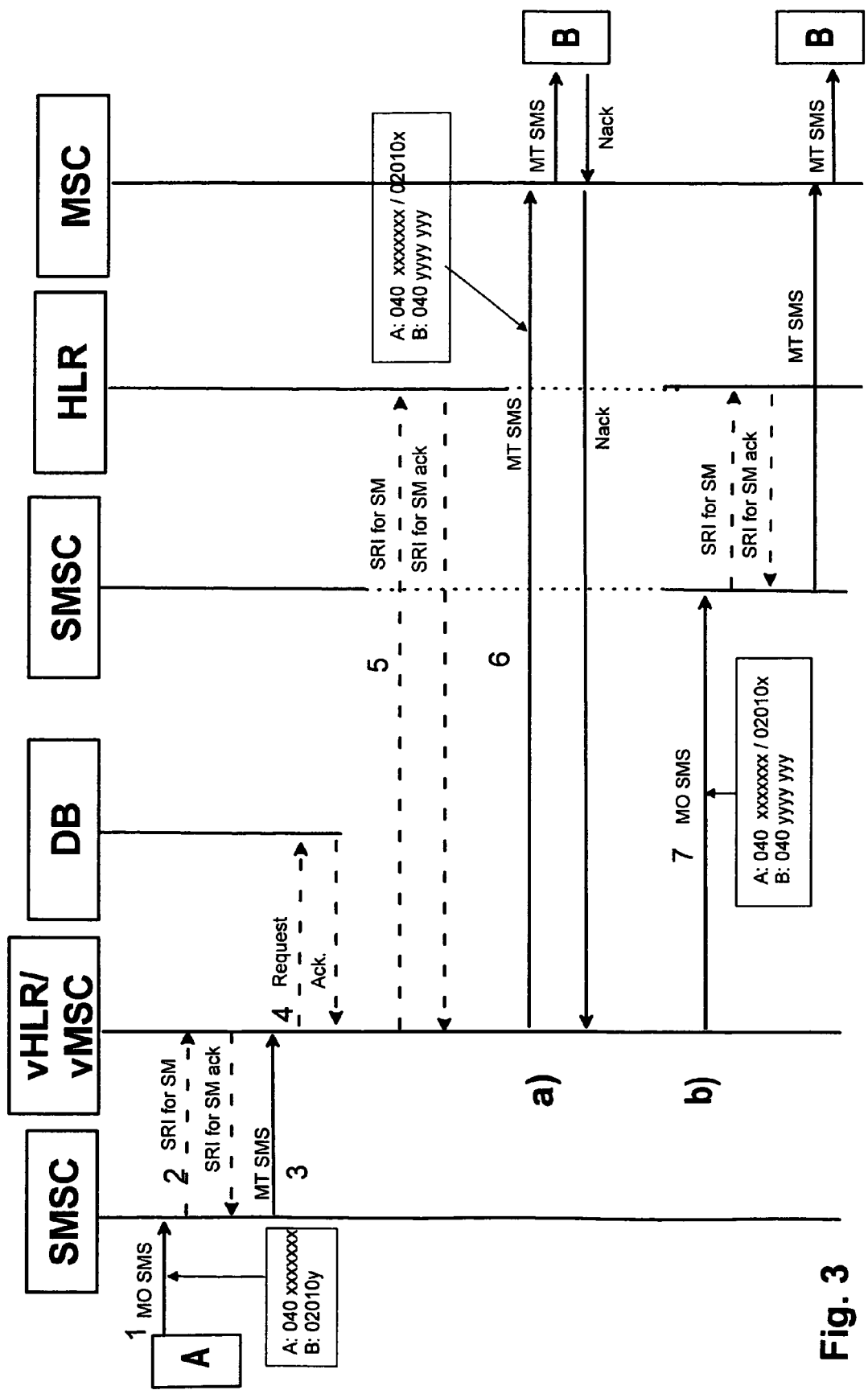
FIG. 3 presents message signaling in both of the above-mentioned cases.

The virtual home location register (vHLR) according to the invention, as well as the virtual mobile switching center (vMSC) can advantageously be implemented as one or more network nodes, advantageously as an SS7 node. FIG. 3 presents a chart connected to the above-described method, where the signaling between said nodes is presented. Point a) in the figure presents the situation according to FIG. 2, where the short message is aimed to be transmitted to the terminal B, which is not accessible. Point b) in the figure presents the situation according to FIG. 1, where the short message can be transmitted successfully to the terminal B.

The above-presented implementation manner for the method according to the invention is an example of one advantageous embodiment. Therefore, it is obvious that the example must not be interpreted as restrictive to the invention, but the embodiments of the invention can be freely varied within the scope of the inventive features presented in the claims hereinbelow.

The invention claimed is:

1. A method for transmitting a short message service message from an A-subscriber to a B-subscriber, comprising the steps of:

using a communication connection formed between the A-subscriber and a short message service center to transmit the short message service message to the short message service center, the short message service message having a target number which is a short number common to a plurality of A-subscribers, wherein the B-subscriber indicated by the short number is different for each of the plural A-subscribers;

transmitting the short message service message from the short message service center to a virtual mobile switching center;

determining, at the virtual mobile switching center, an identification of the A-subscriber, after receiving the short message service message from the short message service center;

determining a temporary identification number, and transmitting the temporary identification number from a virtual home location register to the short message service center;

converting, at said virtual mobile switching center, by using the temporary identification number said short number into a connection number corresponding to said short number and associated with the identified A-subscriber, the connection number being suitable for the communication network of the B-subscriber; and transmitting said short message service message to a mobile switching center and routing said short message service message to the B-subscriber using the connection number.

2. The method according to claim 1, further comprising the step of performing a routing request query from the short message service center to said short number from the virtual home location register, in which case the answer is the address of the virtual mobile switching center.

3. The method according to claim 1, further comprising the step of requesting routing information from an actual home location register using the connection number corresponding to the short number.

4. The method according to claim 1, wherein when the B-subscriber is not accessible, returning the short message service message back to the short message service center, and storing said short message service message at the short message service center until the connection of the B-subscriber to the communication network is formed again.

5. The method according to claim 1, wherein if the connection to the number of the B-subscriber cannot be formed, returning the short message service message to the virtual mobile switching center, converting the returned short message service message into a return message which is further transmitted to the short message service center, and storing the return message at the short message service center until the connection to the B-subscriber is formed.

6. A system for transmitting short message service messages from an A-subscriber to a B-subscriber, which system comprises:

a short message service center for receiving a short message service message via a communication connection formed from the A-subscriber;

a home location register for establishing the routing information of the short message service message on the basis of a connection number of the B-subscriber, the connection number being suitable for the communication number of the B-subscriber;

a mobile switching center for transmitting the short message service message to the connection number suitable for the communication network of the B-subscriber, wherein the short message service message received by the short message service center comprises as its target number a short number common to a plurality of A-subscribers, wherein the B-subscriber indicated by the short number is different for each of the plural A-subscribers;

a virtual home location register determining a temporary identification number;

a virtual mobile switching center for, in response to receipt of the short message service message from the short message service center, identifying the A-subscriber and converting by using the temporary identification number said short number to the communication number suitable for the communication network of the B-subscriber which corresponds to the short number and is associated with the identified A-subscriber in order to transmit the short message service message.

7. The system according to claim 6, wherein the virtual home location register is configured for performing a routing request query for said short number.

8. The system according to claim 6, wherein the short message service center is arranged to store the short message service message when the B-subscriber is not accessible.

9. The system according to claim 6, wherein the system is arranged to return the short message service message to the mobile switching center if a connection to the number of the B-subscriber cannot be formed, which virtual mobile switching center is arranged to convert the short message service message into a return message to be further transmitted to the short message service center for storage until a connection to the B-subscriber is formed.

10. A mobile switching center for transmitting a short message service message from an A-subscriber to a B-subscriber, which mobile switching center comprises means for transmitting a short message service message to a connection number suitable for the communication network of the B-subscriber, wherein the mobile switching center is a virtual mobile switching center arranged such that when the received short message service message comprises as its target number a short number common to a plurality of A-subscribers, wherein the B-subscriber indicated by the short number is different for each of the plural A-subscribers, the virtual mobile switching center identifies the A-subscriber and uses a temporary identification number received from a virtual home location register to convert said short number into a connection number corresponding to the short number and associated with the identified A-subscriber, the connection number being suitable for the communication network of the B-subscriber.

11. The mobile switching center according to claim 10, wherein the virtual mobile switching center is further arranged to receive the short message service message, if a connection to the number of the B-subscriber cannot be established, and that the virtual mobile switching center is arranged to convert the short message service message into a return message to be further transmitted to a short message service center to be stored until a connection with the B-subscriber is established.

12. The method according to claim 1, wherein the virtual mobile switching center is implemented as a network node.

13. The method according to claim 12, wherein the network node is an SS7 node.

14. The system according to claim 6, wherein the virtual mobile switching center is implemented as a network node.

15. The system according to claim 14, wherein the network node is an SS7 node.

16. The mobile switching center according to claim 10, wherein the virtual mobile switching center is implemented as a network node.

17. The mobile switching center according to claim 16, wherein the network node is an SS7 node.

* * * * *